US009358473B2

(12) United States Patent
Frolov

(10) Patent No.: US 9,358,473 B2
(45) Date of Patent: Jun. 7, 2016

(54) INTERACTIVE AMUSEMENT ATTRACTION

(71) Applicant: Anthony Frolov, Bell Canyon, CA (US)

(72) Inventor: Anthony Frolov, Bell Canyon, CA (US)

(*) Notice: Subject to any disclaimer, the term of this patent is extended or adjusted under 35 U.S.C. 154(b) by 0 days.

(21) Appl. No.: 14/666,923

(22) Filed: Mar. 24, 2015

(65) Prior Publication Data
US 2015/0190726 A1 Jul. 9, 2015

(51) Int. Cl.
*A63G 31/16* (2006.01)
*A63F 13/837* (2014.01)
*A63G 33/00* (2006.01)
*A63G 1/02* (2006.01)
*A63G 1/24* (2006.01)
*A63G 5/00* (2006.01)
*A63F 13/216* (2014.01)

(52) U.S. Cl.
CPC .............. *A63G 33/00* (2013.01); *A63F 13/216* (2014.09); *A63F 13/837* (2014.09); *A63G 1/02* (2013.01); *A63G 1/24* (2013.01); *A63G 5/00* (2013.01); *A63G 31/16* (2013.01)

(58) Field of Classification Search
CPC ......... A63G 7/00; A63G 31/00; A63G 31/16; A63F 9/0291; F41J 9/00; F41J 9/14
USPC ......... 472/43, 59, 60, 61, 117, 128, 129, 130; 463/5, 50–53, 30, 34
See application file for complete search history.

(56) References Cited

U.S. PATENT DOCUMENTS

| 5,716,281 | A * | 2/1998 | Dote ........................ F41J 9/14 463/2 |
| 5,785,592 | A * | 7/1998 | Jacobsen ............... A63F 9/0291 273/349 |
| 6,220,965 | B1 * | 4/2001 | Hanna ..................... A63G 7/00 463/52 |
| 6,462,769 | B1 * | 10/2002 | Trowbridge ........... A63G 31/16 348/51 |
| 6,796,908 | B2 * | 9/2004 | Weston .................... A63G 7/00 434/55 |
| 7,351,154 | B2 * | 4/2008 | Muller .................... A63G 7/00 104/55 |
| 8,179,337 | B2 * | 5/2012 | Wilzbach ................ A63G 7/00 104/53 |

* cited by examiner

*Primary Examiner* — Kien Nguyen
(74) *Attorney, Agent, or Firm* — Georgiy L. Khayet

(57) ABSTRACT

An interactive amusement attraction includes a track arranged inside a building and a transportation system having ride vehicles configured to move along the track. There are screens secured inside the building and projectors configured to display video content along the track on the screens. There are also input devices associated with passenger seats of the ride vehicles, which are configured to receive visitor inputs. The attraction also includes a controlling system configured to determine a location of the ride vehicle or visitors on the track, receive the visitor inputs from the input devices, and cause modifying and displaying of the video content based on the visitor inputs and the location of ride vehicle or visitor. The controlling system further causes the transportation system to move the ride vehicle based on the visitor inputs and the location of ride vehicle or visitor.

27 Claims, 6 Drawing Sheets

INTERACTIVE AMUSEMENT ATTRACTION

TECHNICAL FIELD

This disclosure relates generally to entertainment attractions and, more particularly, to interactive amusement attractions, which interactively present video and audio content of controllable events to visitors based on inputs of visitors and locations of visitors.

DESCRIPTION OF RELATED ART

Amusement and theme parks, entertainment attractions, and entertainment rides continue to be popular all over the world. Amusement parks generally include attractions including rides, entertainment venues, playgrounds, recreation spaces, restaurants, and shops. For many years, one of the most popular attractions remains an interactive attraction such as a simulator. One example of a simulator may include a stand or a ride where visitors can operate simulation weapons, like laser guns, to shoot targets. Other simulators may include riding in a simulated automobile, aircraft, or watercraft.

Although interactive attractions have been successfully used for years, there are a number of limitations or problems with their use. First, the experience of interactive attractions may be predictable to many visitors because simulators and video games have become common. Second, most interactive attractions are static, meaning that there are either static targets or a simulator includes a non-movable construction. Third, there are design limitations, such as predetermined track path and predetermined game play scenario, which do not provide sufficient personalization and immersive experiences to users. Hence, there remains a need for an improved interactive amusement attraction.

SUMMARY

This disclosure relates to an interactive amusement attraction which includes a plurality of buildings or rooms, each of which provide an immersive experience to visitors by presenting multimedia content with a story line scenario or game play scenario controlled, at least in part, by the visitors based on their interaction with the content, inputs, and/or locations. A transportation system moves the visitors along a track within the plurality of buildings or rooms using ride vehicles, moving walkways, roller coaster trains, or other means. The movement of visitors can also depend on visitor inputs and visitor locations, which allows them to control, at least in part, their movement along the track. The track can also include multiple sub-tracks allowing the visitors to select one or more of the sub-tracks depending on their inputs and location. Each building or room can include wrap-around projection screens, which are substantially arranged around visitors and configured to display two-dimensional (2D) or three-dimensional (3D) multimedia content. The visitors' experience can be also enhanced with multiple special effects such as motions of substantive elements of ride vehicles, shaking, winds, lights, water sprays, sound effects, fog, smells, electrical sparks, and so forth.

Hence, the interactive amusement attraction of this disclosure provides an immersive, lifelike experience, where the multimedia content is presented to the visitors in a unique, non-predetermined, and controllable manner each time the visitors take a ride or visit the interactive amusement attraction. Ultimately, the visitors can be provided with five-dimensional (5D) experience, where three dimensions belong to a display of multimedia content, a fourth dimension refers to movements of the visitors along the track and other special effects, and a fifth dimension refers to the visitors' interaction with the attraction allowing them to control displayable events and their transportation along the track. Users can interact with the attraction using user input devices, such as game controllers or simulated weapons, or virtually using gestures, motions, voices, and/or speech.

According to one aspect of the present technology, there is provided an interactive amusement attraction. The interactive amusement attraction comprises a track arranged inside a room or a building and a transportation system having at least one ride vehicle configured to move along the track. The ride vehicle includes at least one passenger seat. There is at least one screen secured inside the room or the building and at least one projector configured to display video content along the track on the at least one screen. The interactive amusement attraction further comprises at least one input device associated with the at least one passenger seat and configured to receive visitor inputs. The interactive amusement attraction further comprises an amusement controlling system configured to determine a location of the at least one ride vehicle or at least one visitor on the track, receive the visitor inputs from the at least one input device, control the at least one projector to display the video content on the at least one screen, and control the transportation system to cause the at least one ride vehicle to move along the track. The video content is displayed based on the visitor inputs and based on the location of the at least one ride vehicle or the at least one visitor. Similarly, the at least one ride vehicle is moved based on the visitor inputs and the location of the at least one ride vehicle or the at least one visitor.

According to some embodiments, the interactive amusement attraction further comprises at least one additional room or building, where the track is arranged within the at least one additional room or building. The at least one additional room or building further comprises at least one additional screen secured and at least one additional projector, where the amusement controlling system is further configured to control the at least one additional projector to display the video content on the at least one additional screen depending on the visitor inputs and the location of the at least one ride vehicle or the at least one visitor. The track may include a plurality of sub-tracks connected to each other, and the amusement controlling system may be further configured to select at least one of the sub-tracks for the at least one ride vehicle to move along the selected at least one of the sub-tracks based on a predetermined rule and at least one of the following: the visitor inputs, the location of the at least one ride vehicle, and the location of the at least one visitor.

According to some embodiments, the input device may include a simulated weapon associated with the at least one passenger seat or a game controller associated with the at least one passenger seat. The room or the building may include a tunnel, a watercraft, or a raft. According to some embodiments, the room or the building further comprises an entrance door and an exit door, where the track is arranged within the room or the building and goes through the entrance door and the exit door. The amusement controlling system may be further configured to open and close the entrance door and open and close the exit door based on a predetermined rule and at least one of the following: the visitor inputs, the location of the at least one ride vehicle, and the location of the at least one visitor.

According to some embodiments, the at least one screen has at least a partially cylindrical, partially semi-spherical, or spherical shape. The transportation system may further comprise at least one rail along the track and at least one driver or motor configured to move the at least one ride vehicle along the track, with the at least one ride vehicle being in a rolling contact with the at least one rail. The transportation system may further comprise at least one moving walkway along the track and at least one driver configured to move the at least one ride vehicle along the track, where the at least one ride vehicle is in a contact with the at least one moving walkway.

According to some embodiments, the interactive amusement attraction may further comprise a water channel arranged along the track inside the room or the building, and where the transportation system further comprises at least one driver configured to move the at least one ride vehicle along the track.

According to some embodiments, the at least one ride vehicle may include a floating raft, a boat, or an electrical vehicle configured to move, rotate, or turn based on commands of the at least one visitor. The at least one ride vehicle may include a roller coaster train having one or more train cars. In some embodiments, the images or the video displayed by the at least one projector are associated with one or more video games or one or more computer games.

According to some embodiments, the interactive amusement attraction may be further configured to modify the video content displayed by the at least one projector based at least in part on the visitor inputs, the location of the at least one ride vehicle, and/or the location of the at least one visitor. According to yet more embodiments, the interactive amusement attraction may be further configured to control the at least one projector to display one or more virtual targets based on a predetermined rule and at least one of the following: the visitor inputs, the location of the at least one ride vehicle, and the location of the at least one visitor.

According to some embodiments, the interactive amusement attraction further comprises at least one sensor configured to detect an emission from the at least one input device as operated by the at least one visitor, where the amusement controlling system is further configured to modify the video content displayed by the at least one projector based at least in part on the detected emission. The amusement controlling system can be further configured to determine whether the determined emission hits or misses one or more virtual targets displayed by the at least one projector, and modify the video content displayed by the at least one projector based at least in part on the determination. In certain embodiments, the amusement controlling system can be further configured to maintain a plurality of story line scenarios or a plurality of game play scenarios, wherein each of the story line scenarios or each of the game play scenarios is associated with the video content. The amusement controlling system can be further configured to select at least one of the story line scenarios or at least one of the game play scenarios based on at least one of the following: the visitor inputs, the location of the at least one ride vehicle, and the location of the at least one visitor. The amusement controlling system can be further configured to modify the video content as displayed by the at least one projector based on the selected at least one of the story line scenario or at least one of the game play scenario.

According to some embodiments, the interactive amusement attraction further comprises at least one audio device configured to present audio content at selected locations along the track, where the at least one audio device is arranged inside the room or the building, and where the amusement controlling system is further configured to control the at least one audio device to provide the audio content based on the visitor inputs and based on the location of the at least one ride vehicle or the at least one visitor.

According to some embodiments, the interactive amusement attraction further comprises one or more special effect devices configured to generate one or more of wind, fog, smell, a spark, and water spray, where the one or more special effect devices are actuated based on the visitor inputs, the location of the at least one ride vehicle, or the location of the at least one visitor.

According to one aspect of the present technology, there is provided an interactive amusement attraction, which comprises: a building having a track; a transportation system having at least one moving walkway configured to move at least one visitor along the track; at least one screen secured inside the building; at least one projector secured inside the building and configured to display video content along the track on the at least one screen; at least one input device configured to receive inputs of the at least one visitor; and an amusement controlling system. The amusement controlling system can be configured to: determine a location of the at least one visitor on the track; receive the inputs of the at least one visitor from the at least one input device; control the at least one projector to display the images or the video on the at least one screen based on the inputs of the at least one visitor and based on the location of the at least one visitor; and control the transportation system to cause the at least one moving walkway to move along the track based on the inputs of the at least one visitor and the location of the at least one visitor.

According to one aspect of the present technology, there is provided a method for providing a ride experience within an interactive amusement attraction, where the interactive amusement attraction has at least one room or building with a track, a transportation system with at least one ride vehicle configured to move along the track, and an amusement controlling system. The method may comprise: determining a location of the at least one ride vehicle or at least one visitor on the track; receiving inputs of the at least one visitor from at least one input device associated with the at least one ride vehicle; presenting at least one image or video on at least one screen positioned along the track inside the room or the building, where the at least one image or the video is displayed based on the inputs of the at least one visitor and based on the location of the at least one ride vehicle or location of the at least one visitor on the track; presenting sounds along the track at selected locations inside the room or the building based on the inputs of the at least one visitor and based on the location of the at least one ride vehicle or location of the at least one visitor on the track; and moving the at least one ride vehicle along the track inside the room or the building based on the inputs of the at least one visitor and based on the location of the at least one ride vehicle or location of the at least one visitor on the track.

Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
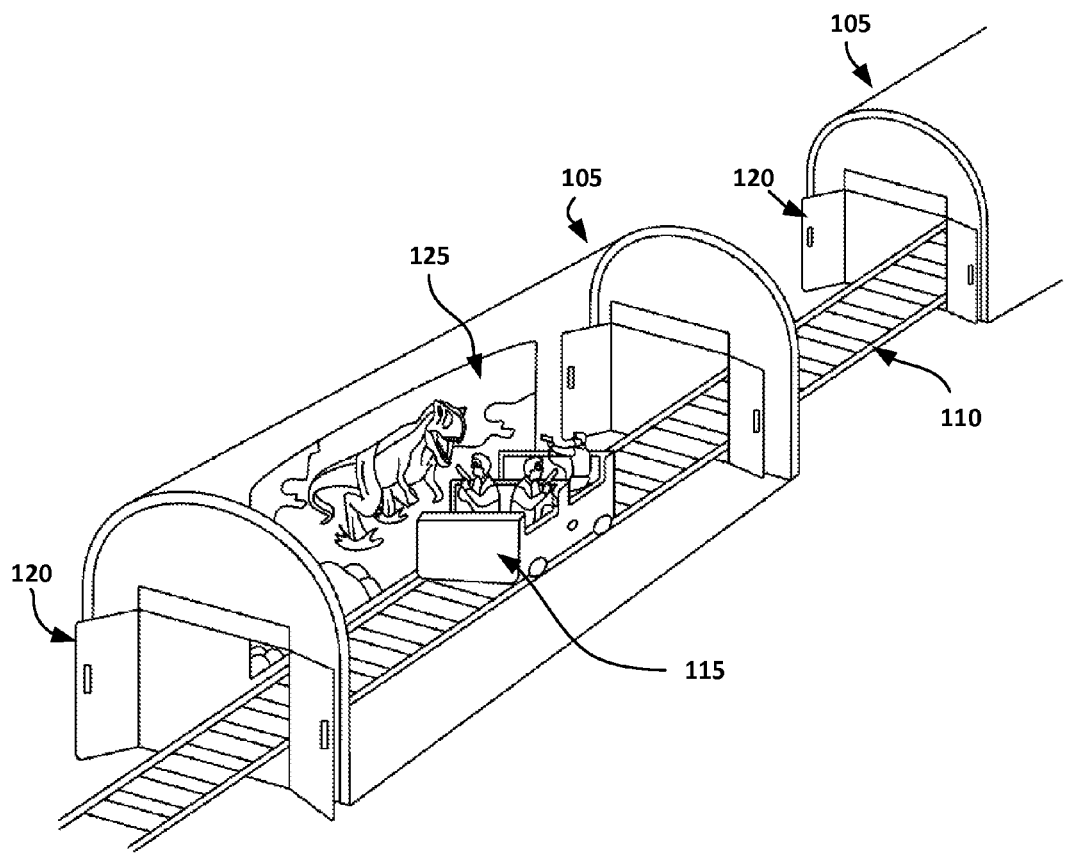
FIG. 1 shows a perspective view of an embodiment of an interactive amusement attraction, where a transportation system includes rails and ride vehicles.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter.

The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

1. Introduction

The present technology generally provides for an interactive amusement attraction and method of its operation, where visitors can experience immersion into a 5D virtual reality having a configurable story line scenario or game play scenario. In particular, visitors of the interactive amusement attraction are moved along one or more tracks inside a series of buildings or rooms within one building, where each of the building or room includes a wrap-around screen for displaying video content substantially around the visitors. The video content can be either 2D or 3D. Audio system may also be employed inside the buildings or rooms to provide audio content at various locations to match displayable video content. Together, audio and video contents constitute multimedia content with one or more customizable story lines or game play scenarios.

The visitors can interact with the multimedia content using input devices, such as simulation weapons, game controllers, or remote controllers. Based on the visitors' inputs, the multimedia content is dynamically changed. For example, the visitors can control the display of multimedia content by shooting virtual targets using simulated weapons. In another example, the visitors can select particular portions of multimedia content for further presentation, thereby creating a unique storyline scenario. In yet another example, visitors can poll or vote to control the multimedia content and its modification. In some embodiments, the visitors can interact with the multimedia content using gestures, movements, motions, and voice commands. The visitors' experience can be further enhanced with special effects like winds, water sprays, shaking, fog, smells, sparks, and so forth.

The interactive amusement attraction may include a transportation system configured to physically move the visitors along a track. The track can be a closed-loop and include a plurality of sub-tracks, which can have same or similar routes. The movement along one or more of the sub-tracks can depend on visitors' interaction with the multimedia content. The transportation system can include roller coaster rides, motorized or non-motorized vehicles, moving walkways, escalators, floating waters, or any other system for moving visitors along the track. Moreover, visitors' interaction with the multimedia content may modify the movement, rotation, shaking, or other motion of the visitors depending on a particular method of their transportation.

The interactive amusement attraction of this disclosure can be used for a wide range of purposes, from entertaining to educational. In one example, the interactive amusement attraction can be used as a roller coaster ride employed at a theme park. In another example, the interactive amusement attraction can provide a gaming experience to the visitors allowing them to move from one 5D environment employed in one building or room to another 5D environment employed in another building or room. The visitors can be engaged in computer gameplay. For example, they can use a simulated weapon to shoot virtual targets within each of the 5D environments, select or modify gameplay scenarios, and select one or more of the sub-tracks to move within the attraction. The visitors may be also engaged in competition with each other based on their game performance metrics or other factors such as time or speed. Because each 5D environment may provide a separate game scene, the visitors may believe they are on a lifelike ride within a virtual reality rather than in a conventional, stationary simulator.

The same principles can be used for military or police trainings. Again, 5D environments provided within the attraction can put trainees into unpredictable scenes, decide whether they should shoot moving virtual targets displayed on screens, make decisions as to where move next, answer quiz questions, and cooperate with each other to meet a common goal.

In another embodiment, the interactive amusement attraction of this disclosure can be used for educational purposes. For example, the interactive amusement attraction can be employed as an interactive museum or an interactive museum exhibition. In this embodiment, each building or room can provide a 5D environment for the visitors to immerse them into historical scenes or remote geographical scenes. The 5D environments can also present art objects depending on a particular application. Here, the visitors can also interact with the multimedia content, select topics of interest, select sub-tracks for further movement, select storyline scenarios, interact with other visitors, vote, and so forth. In some embodiments, displayable art objects or other displayable content can be modified in real time based on visitors' actions, locations and/or movements.

Further, in yet more embodiments, the interactive amusement attraction can be used for multiple purposes. For example, during the daytime, the interactive amusement attraction is used as an interactive museum for educating visitors, while at night, the interactive amusement attraction is used as a gaming attraction allowing immersion of visitors into a virtual reality of a computer game. Other combinations can be also possible.

2. General Design of Interactive Amusement Attraction

Referring now to the drawings, FIGS. 1 through 4 illustrate several embodiments of the present interactive amusement attraction. As shown in these figures, the interactive amusement attraction 100 includes multiple buildings, rooms or scenes 105 (hereinafter collectively called "buildings" for simplicity). Each of the buildings 105 provide a "closed" structure where a 5D environment can be generated as described herein. There is at least one track 110 arranged through buildings 105. Track 110 may be circular or linear and arranged in such a way that visitors may follow the track 110 to visit buildings 105 one after another.

Buildings 105 can generally include permanent or temporary buildings such as hangers or pavilions. In some embodiments, buildings 105 can also refer to tunnels. Buildings 105 can be arranged on the ground, on water, underground, and/or underwater. In some embodiments, buildings 105 may be arranged on a watercraft or raft. Buildings 105 can be a part of another building such as a museum building. In yet more embodiments, buildings 105 can be arranged in a theme park. As discussed above, buildings 105 can refer to rooms, which can be arranged inside one or more buildings or tunnels.

Buildings 105 can further have any suitable shape and design. For example, buildings 105 can have a substantially cylindrical shape, cuboid shape, rectangular parallelepiped shape, sphere shape, semi-sphere shape, or any other modification thereof.

The visitors can be transported by a transportation system, which may include a railroad, roller coaster, or generally speaking, a path with motorized or non-motorized vehicles of any kind. FIG. 1 shows a ride system with rails and ride vehicle 115 being in a rolling contact with the rails. Ride vehicle 115 may include at least one passenger seat. Ride vehicle 115 can be motorized, such as an electric car, or non-motorized, such as a roller coaster train car. The transportation system may include one or more drivers configured to move ride vehicle 115 along the track 110. The rails can be arranged on the ground, or can be secured to a wall or ceiling of buildings 105 or other supporting means. In some embodiments, ride vehicles 115 can refer to electric vehicles configured to move, rotate, or turn based on predetermined rules, visitors' commands, staff commands, location of visitors, and/or location of ride vehicle 115.

In some embodiments, the transportation system may include one or more moving walkways, travellators, and/or escalators. In this example, the transportation system may optionally include ride vehicles or platforms for carrying visitors. These ride vehicles or platforms can be permanently or temporary secured to the moving walkways, travellators, and/or escalators. The transportation system and/or each of ride vehicles 115 may be provided with additional actuators to provide special effects such as rotational platforms, multi-degree of freedom base, turning actuators, shaking actuators, and so forth.

Figure 2:
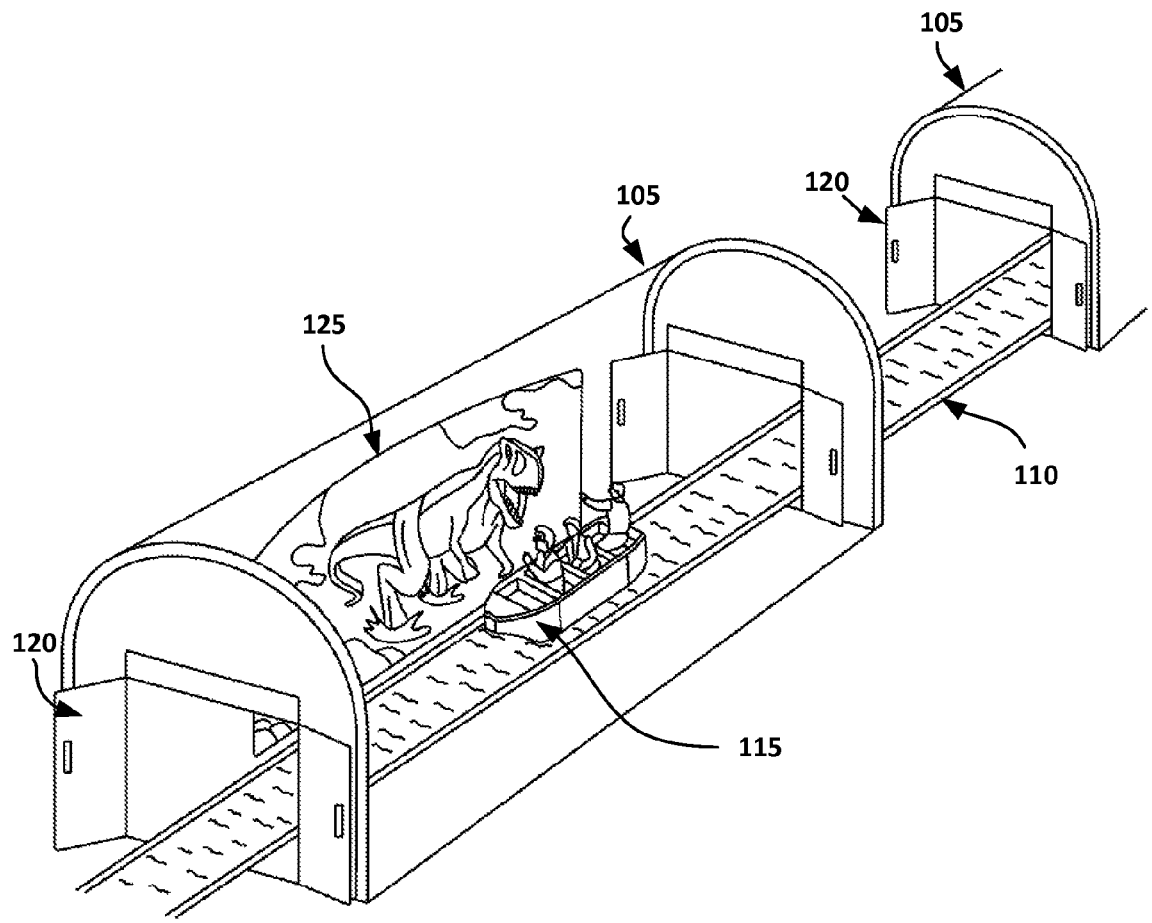
FIG. 2 shows a perspective view of an embodiment of an interactive amusement attraction, where a transportation system includes a water channel.

As shown in FIG. 2, track 110 may include a water channel with still or flowing waters. In this example embodiment, ride vehicle 115 includes a boat or raft with at least one passenger seat. Ride vehicle 115 may be moved along the water channel either by the action of flowing waters or by the action of drivers, motors, engines, and/or actuators arranged within ride vehicle 115 or outside and may be a part of the transportation system. Rails can be provided within the water channel for facilitating movement of ride vehicles 115.

Buildings 105 may optionally include entrance and exit doors 120 through which track 110 can be arranged. In some embodiments, entrance and exit doors 120 include openers to automatically open or close them based on predetermined rules, visitors' commands, staff commands, location of visitors, and/or location of ride vehicle 115. Entrance and exit doors 120 may include traditional doors, roller shutters, garage doors, and so forth.

There is at least one screen 125 arranged inside buildings 105 for displaying projected images or videos. In one example embodiment, screen 125 is an internal surface of building 105. In another embodiment, screen 125 is a display screen typically employed in cinema theatres. Screen 125 may have a flat or curved shape. For example, screen 125 may have partially cylindrical or partially semi-spherical, semi-spherical, spherical, elliptical, or any other suitable shape.

Figure 3:
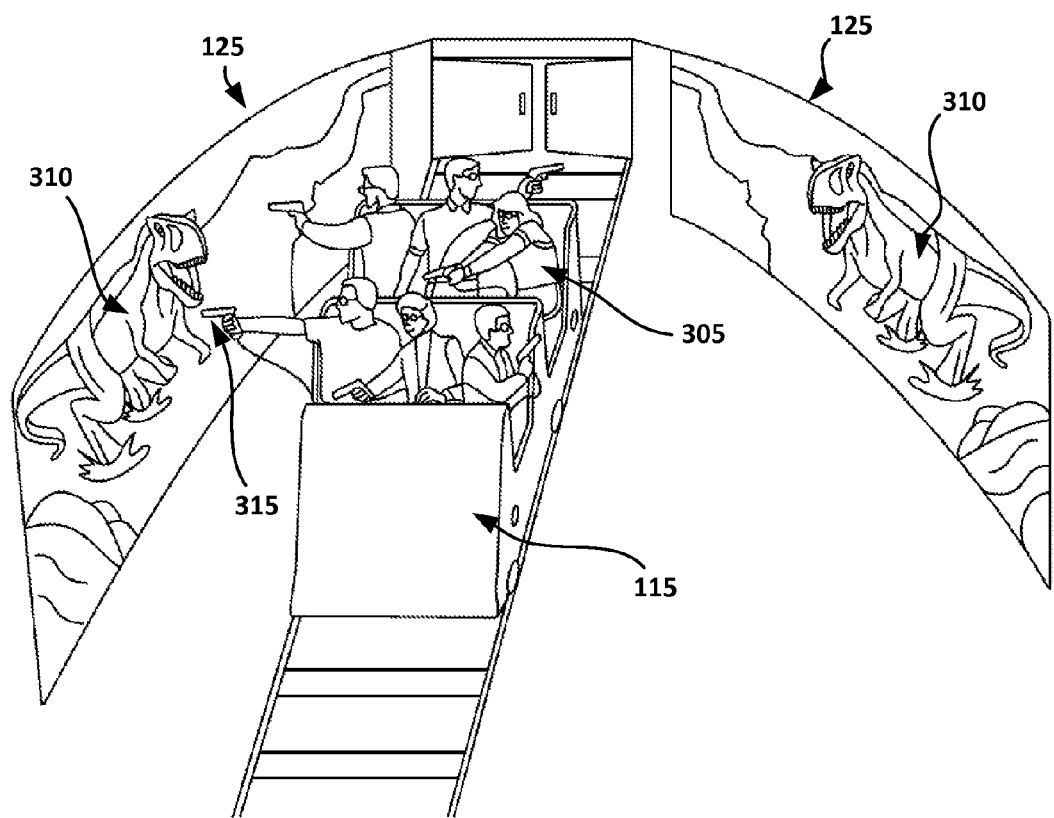
FIG. 3 shows an enlarged view of one of the ride vehicles shown in FIG. 1.

As shown in FIG. 3, one or more screens 125 can be arranged substantially around visitors 305 and ride vehicle 115 such that visitors 305 can experience immersional into surrounding virtual reality displayed on these screens. In some embodiments, one or more virtual targets 310 can be displayed on screens 125. Virtual targets 310 can be displayed, moved, and modified based on predetermined rules, visitors' commands, staff commands, location of visitors, and/or location of ride vehicle 115.

Visitors 305 can be provided with input devices 315 such as simulated weapons (e.g., simulated laser shotguns or light guns), game controllers, remote controllers, joysticks, keypads, trackballs, steering wheels, pedals, touch screens, motion sensors, video cameras, microphones, and/or pointing devices. Input devices 315 can be associated with passenger seats provided in ride vehicles 115. For example, one or more input devices 315 can be attached or secured to or near passenger seats. In general, input devices 315 are configured to receive visitors' inputs, such as control commands, selections, text, speech, video, motions, gestures, and the like. In other embodiments, input devices 315 can be portable devices not associated with ride vehicles 115.

One or more sensors can be provided to detect light or electromagnetic emissions generated by one or more input devices 315. The sensors can be provided near screen 125, on screen 125, or behind screen 125. In some embodiments, displayable images or video, including the virtual targets, can be modified based at least in part on the emissions detected by the sensors. More specifically, the displayable content or the scenarios can be modified or controlled based on determination of whether the determined emission detected by the sensors hits or misses virtual targets 310 displayed on one or more screens 125.

There can be provided one or more location sensors configured to detect a current location of any given ride vehicle 115 and/or any given visitor 305. Location sensors may be secured on ride vehicles 115 or anywhere along the track 110. In some embodiments, location sensors refer to infrared sensors, radio sensors, antennas, touch sensors, contact sensors, and so forth.

Figure 4:
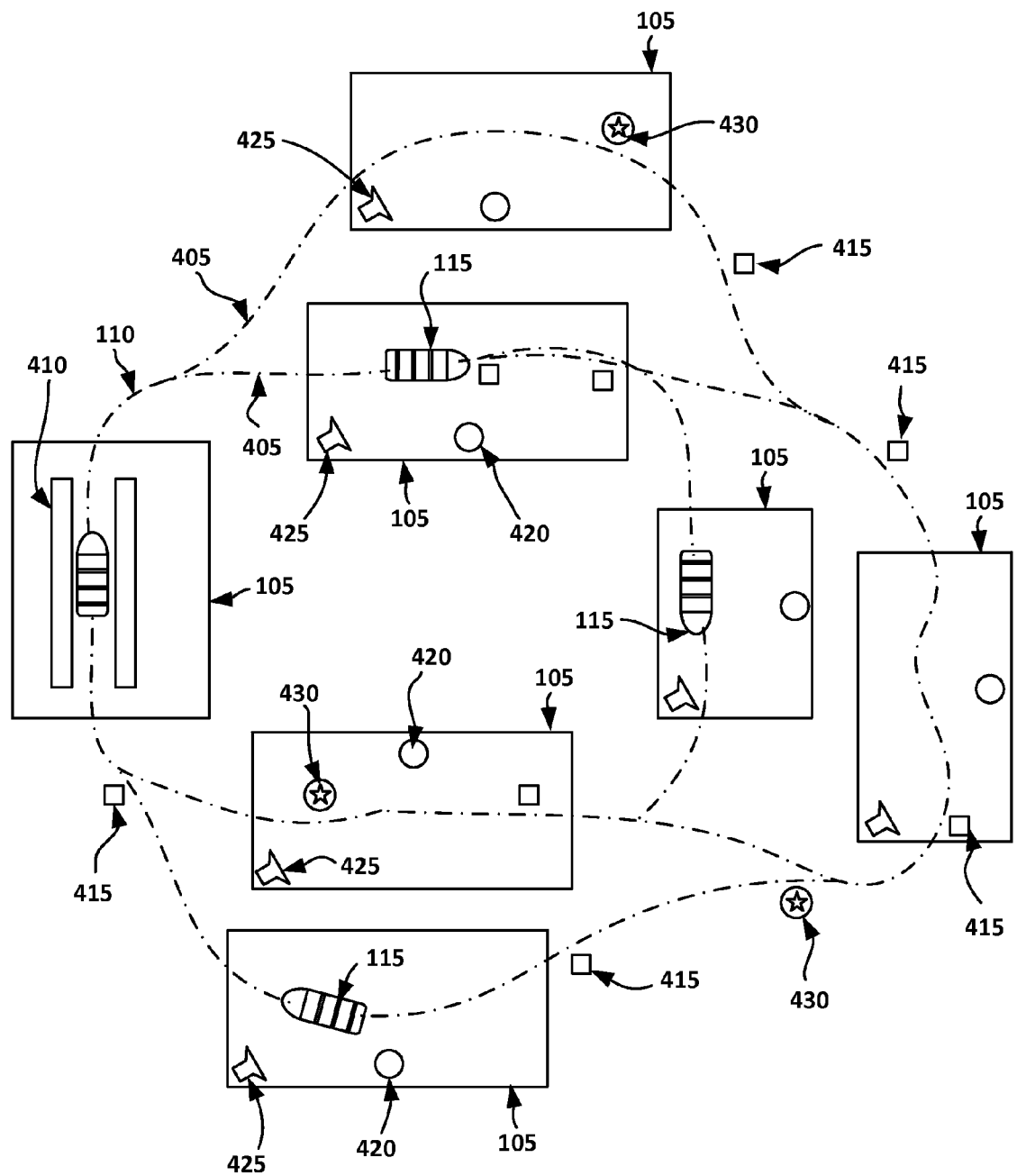
FIG. 4 shows a plan view of an embodiment of an interactive amusement attraction.

FIG. 4 further shows a plan view of an embodiment of an interactive amusement attraction. In this figure, there are shown multiple rooms or buildings 105 and track 110 arranged in a continuous loop though all of the rooms or buildings 105. As discussed above, track 110 may include one or more of sub-tracks 405 which can be connected to each other and allow ride vehicles 115 to move along any of sub-tracks 405. In accordance with various embodiments, a route for each particular ride vehicle 115 can depend on predetermined rules, visitors' commands, staff commands, location of visitors, and/or location of ride vehicle 115.

In the shown embodiment, the interactive amusement attraction further includes a passenger loading/unloading platform 410. In some embodiments, the interactive amusement attraction further includes additional rooms or buildings including wait premises, halls, ticket offices, technical areas, and/or retail stores. In some embodiments, these additional rooms or buildings can be disposed underground or under water.

As further shown in FIG. 4, the interactive amusement attraction may include one or more location sensors 415 configured to detect location of ride vehicles 115 and/or location of visitors. The interactive amusement attraction further includes one or more projectors 420 to project images or videos on screens 125. The interactive amusement attraction further includes one or more audio devices 425, such as speakers, configured to deliver audio content to the visitors at selected locations inside rooms or buildings 105 along track 110 or inside ride vehicles 115. Audio devices 425 can be secured to floors, walls, or ceilings of rooms or buildings 105. In some embodiments, audio devices 425 are provided in ride vehicles 115.

According to various embodiments of this disclosure, the audio content is presented via audio devices 425 based on predetermined rules, visitors' commands, staff commands, location of visitors, and/or location of ride vehicle 115. The audio content may include music, noises, audio effects, narrator speech, and so forth. In some embodiments, audio devices 425 may include portable audio devices with headphones or speakers. These portable audio devices may be worn by visitors, and these devices may present the audio content in a particular language selected from a plurality of languages.

In yet more embodiments, the interactive amusement attraction further includes one or more special effects devices 430 arranged inside rooms or buildings 105 along track 110 and/or in ride vehicles 115. These special effect devices 430 are configured to generate various lighting effects, water spraying, fog, wind, smells, sparks, and the like. At least some of special effect devices 430 include spot lights, flashlights, stroboscopes, fans, speakers, subwoofers, switches, heaters, and so forth. In some embodiments, special effect devices 430 may be configured to affect motion of ride vehicles 115 and, more specifically, special effect devices 430 may be configured to rotate, turn, shake, and/or incline ride vehicles 115 at selected locations along track 110. In any case, special effect devices 430 can be activated in accordance with predetermined rules, visitors' commands, staff commands, location of visitors, and/or location of ride vehicle 115.

3. System Architecture and Method of Operation

Figure 5:
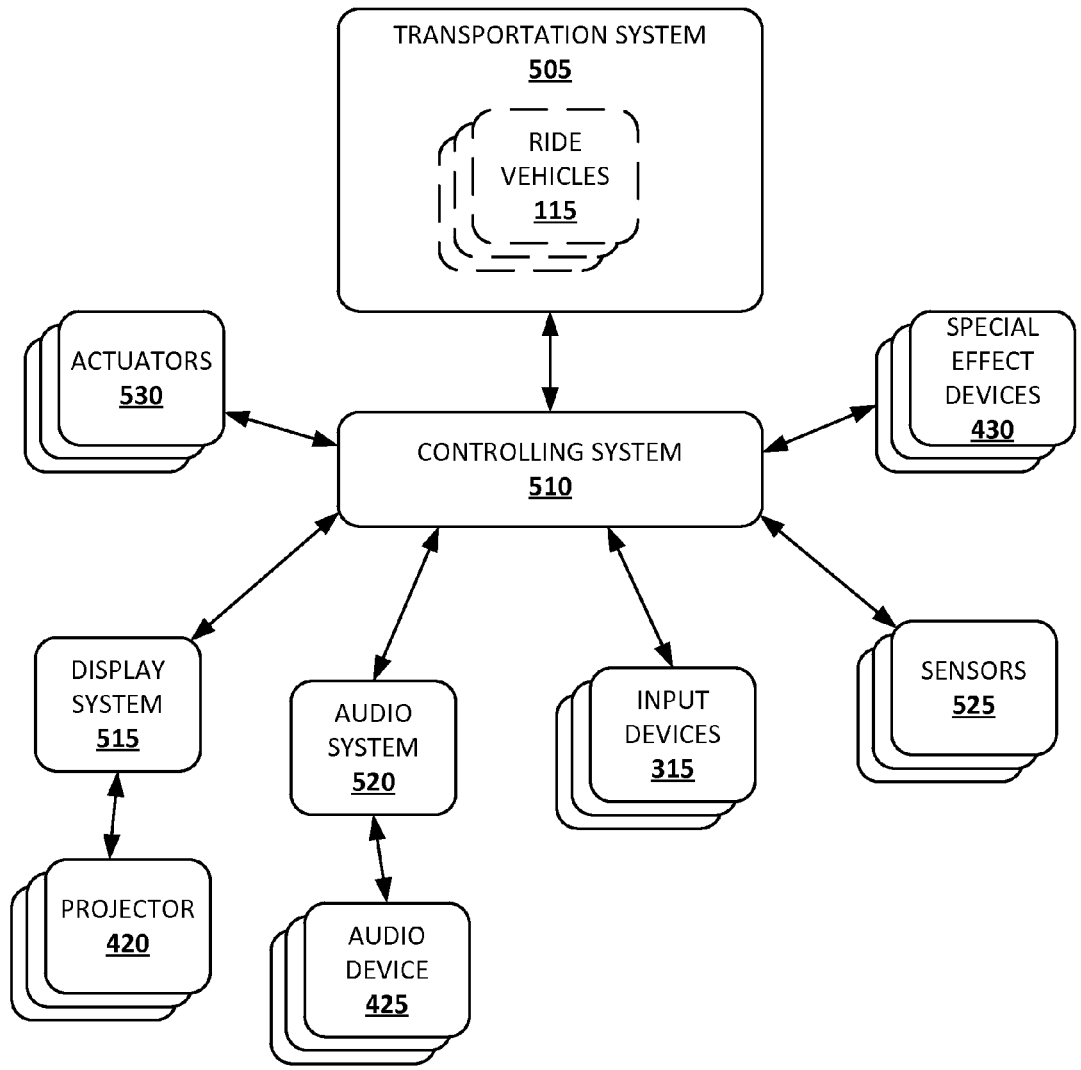
FIG. 5 shows an embodiment of a technical environment suitable for implementing in the interactive amusement attraction

FIG. 5 shows an embodiment of a system environment 500 suitable for implementing in the interactive amusement attraction. System environment 500 comprises transportation system 505, which is configured to transport visitors along track 110. Transportation system 505 uses ride vehicles 115 optionally equipped with passenger seats and input devices 315 for receiving visitors' inputs. Ride vehicles 115 can be moved with the help of actuators, motors, engines, or drivers arranged inside ride vehicles 115, or outside of ride vehicles 115 and along track 110. In some embodiments, transportation system 505 may include moving walkways or escalators. In yet more embodiments, passenger seats or ride vehicles 115 can be secured to the moving walkways or escalators. Visitors' inputs provided via input devices 315 are transmitted to controlling system 510. Controlling system 510 can control the operation of transportation system 505 and cause starting and stopping of the actuators, motors, engines, and/or drivers to cause visitors move inside the interactive amusement attraction. The control of transportation system 505 can depend on visitors' inputs, visitors' location, location of particular ride vehicles, and other factors.

System environment 500 further includes display system 515 and audio system 520. Display system 515 may include one or more image displaying devices such as projectors 420 configured to display 2D or 3D video content on one or more screens 125. The video content may include one or more predetermined images, one or more predetermined videos, one or more virtual targets, one or more customizable images, and/or one or more customizable videos. The video content can be associated with one or more story line scenarios and/or one or more game play scenarios.

Audio system 520 includes a plurality of audio devices 425 arranged inside rooms or buildings 105 and/or on ride vehicles 115. In some embodiments, audio devices 425 are portable devices. Audio devices 425 are configured to provide audio content which may include predetermined audio signals or customizable audio signals. The audio content can match the video content. In some embodiments, the audio content can be associated with one or more story line scenarios and/or one or more gameplay scenarios.

System environment 500 further includes a plurality of sensors 525, including location sensors configured to detect a location of ride vehicles 115, a location of at least one visitor, and emissions of input devices 315. Data obtained from sensors 525 is transmitted to controlling system 510.

Further, as shown in FIG. 5, system environment 500 optionally includes one or more special effect devices 430 arranged at selected locations along track 110 and configured to generate wind, smell, fog, spark, and/or water spray. In some embodiments, special effect devices 430 can affect motion of ride vehicles 115 by turning, inclining, shaking, elevating, dropping, and/or rotating. Controlling system 510 can control the operation of special effect devices 430 and this control can depend on visitors' inputs, visitors' location, location of particular ride vehicles 115, and other factors.

System environment 500 may also include a plurality of actuators, drivers, engines, motors, and/or switches 530 (collectively referenced herein to as "actuators" for simplicity). For example, these actuators 530 can open and close the entrance and exit doors 120, although they can be used for other needs. Controlling system 510 can control the operation of actuators 530 and this control can depend on visitors' inputs, visitors' location, location of particular ride vehicles 115, and other factors.

Data communication between described elements of system environment 500 is provided via one or more communications links and/or one or more communications networks. For example, the communication link/network may include a peer-to-peer network, Internet, local intranet, personal area network, local area network, wide area network, Ethernet connection, integrated services digital network line, cellular network, Institute of Electrical and Electronics Engineers (IEEE) 802.11 based network, Bluetooth radio, and so forth.

Controlling system 510 is generally configured to control operation of the entire interactive amusement attraction including all its elements in accordance with software or firmware provided therein. Controlling system 510 may refer to a general-purpose computer, server, personal computer, desktop computer, or a computing device of any kind. Accordingly, controlling system 510 includes one or more processors, memory, storage device, network interface, communication bus, and other elements not relevant for this disclosure. In some embodiments, controlling system 510 may also include one or more terminals for enabling personnel to monitor and manually control operation of any of the described elements of interactive amusement attraction. In some embodiments, controlling system 510 may refer to a distributed computing system or cloud computing system.

A non-transitory computer-readable medium, such as the storage device of controlling system 510, may store one or more sets of instructions, data structures, software, firmware, and/or computer programs configured to enable automatic operation and communication of the elements of the present interactive amusement attraction. The term "computer-readable medium" shall also be taken to include any medium that is capable of storing, encoding, or carrying a set of instructions for execution by a machine, and that causes the machine to perform any one or more of the methods of the present disclosure.

Figure 6:
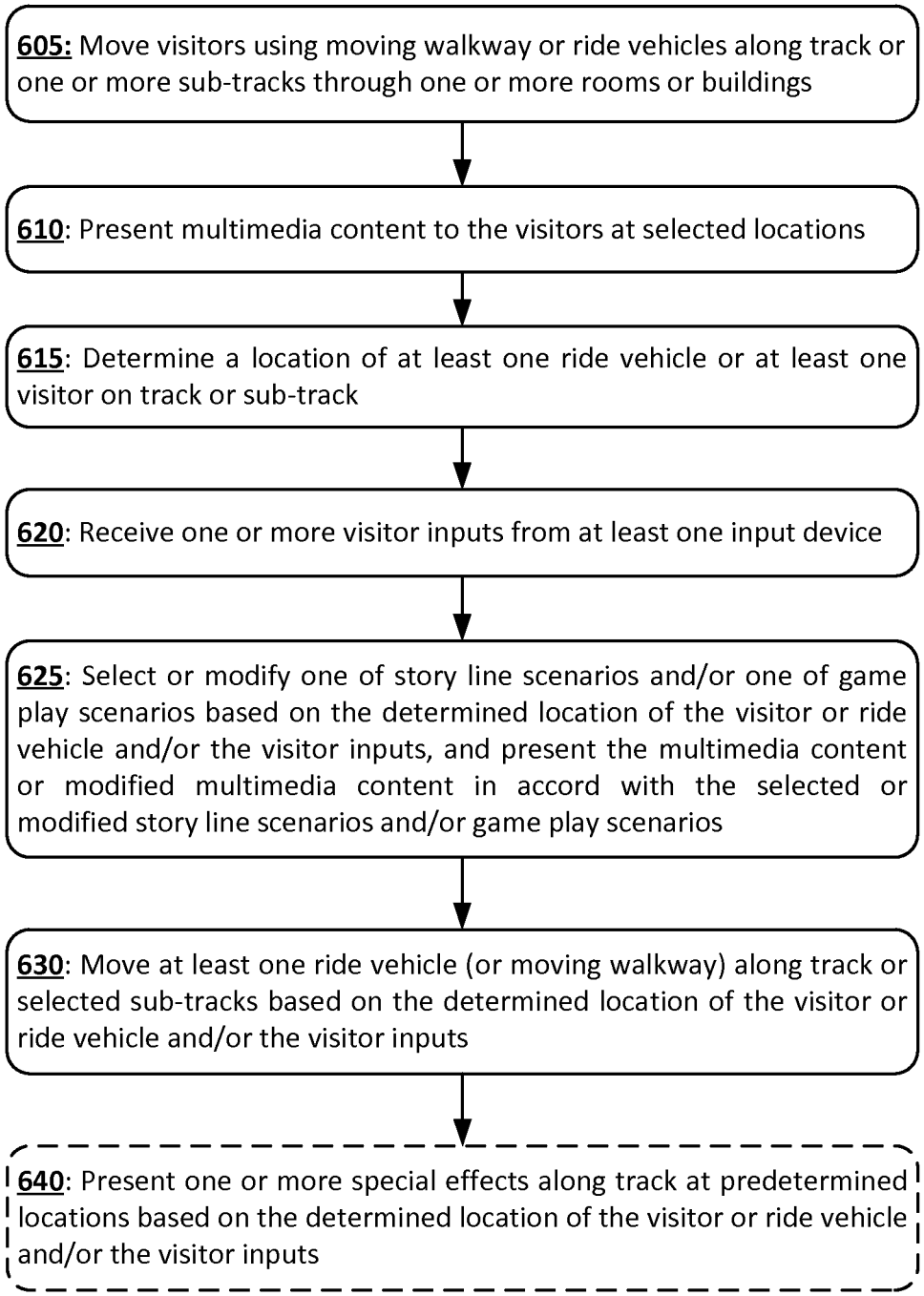
FIG. 6 is a process flow diagram showing an example method for operating a present interactive amusement attraction and providing a ride experience for at least one visitor.

FIG. 6 is a process flow diagram showing an example method 600 for operating the present interactive amusement attraction and providing a ride experience for at least one visitor. The method may be performed by processing logic that may comprise hardware (e.g., decision-making logic, dedicated logic, programmable logic, and microcode), software (such as software run on a general-purpose computer system or a dedicated machine), or a combination of both. In one embodiment, the processing logic refers to one or more components of controlling system 510. Note that below recited steps of method 600 may be implemented in an order different than described and shown in FIG. 6. Moreover, method 600 may have additional steps not shown herein, but which can be evident for those skilled in the art from the present disclosure. Method 600 may also have fewer steps than outlined below and shown in FIG. 6.

Method 600 commences at step 605 with controlling system 510 causing transportation system 505 to move at least one ride vehicle 115 along track 110 or one or more sub-tracks 405 through one or more rooms or buildings 105. Controlling system 510 can control the direction, speed, and routes of ride vehicle 115 based on predetermined rules. Controlling system 510 can also select one or more sub-tracks 405 based on predetermined rules, staff commands, visitors' commands, location of at least one visitor, and/or location of at least one ride vehicle 115. In some embodiments, at step 605, transportation system 505 moves or actuates a moving walkway instead of moving ride vehicle 115.

As discussed above, transportation system 505 moves ride vehicle 115 along track 110 by actuating at least one driver, motor, engine, and/or actuator. Furthermore, ride vehicle 115 can be rotated, turned, inclined, elevated, pushed, and/or shaken based on predetermined rules, staff commands, visitors' commands, location of at least one visitor, and/or location of at least one ride vehicle 115.

At step 610, controlling system 510 causes display system 515 and audio system 520 to present multimedia content to the visitors riding the ride vehicle 115 or the moving walkway. The multimedia content may include 2D or 3D video content and audio content, both associated with a computer game, simulation training, and/or educational session. In some embodiments, the multimedia content may include a plurality of video content elements and audio content elements, which are selectively presented to the visitors by controlling system 510 based on predetermined rules, personnel selections, visitors' inputs, or other factors. The multimedia content can be presented at locations selected by controlling system 510 based on predetermined rules, visitors' commands, location of at least one visitor, and/or location of at least one ride vehicle 115.

According to some embodiments, controlling system 510 may store a plurality of story line scenarios and/or a plurality of game play scenarios associated with the multimedia content. These scenarios may be automatically customized based on predetermined rules, personnel selections, visitors' inputs, or other factors such as location of ride vehicles 115 or visitors' location. The customization of story line scenarios and gameplay scenarios means that controlling system 510 selects or renders the multimedia content based on predetermined criteria. For example, controlling system 510 can customize a story line scenario and game play scenario by dynamically combining some of the video content elements and audio content elements together to provide a unique virtual reality immerse experience to the visitors.

At step 615, controlling system 510 determines a location of at least one ride vehicle 115 or at least one visitor on track 110. The determination is made based on information gathered by one or more sensors 525 such as location sensors.

At step 620, controlling system 510 receives one or more visitor inputs from at least one input device 315 controlled by at least one visitor. The visitor inputs may include commands, signals, instructions, texts, video input, audio input, or any other digital data. For example, one visitor input may be generated when a visitor touches a touchscreen or presses one or more buttons. In another example, one visitor input may include a shoot with a simulation weapon. In yet another example, one visitor input may relate to a gesture, movement, or voice command captured by a camera or microphone (both relate to input devices 315).

At step 625, controlling system 510 selects or modifies one of story line scenarios and/or one of gameplay scenarios associated with the multimedia content presented at step 610. The selection or modification of these scenarios is made based on the determined location of the visitor or ride vehicle 115 and/or visitor input. In some embodiments, the selection or modification of these scenarios is made based on personnel inputs and/or predetermined rules.

Further, at the same step 625, controlling system 510 causes display system 515 and audio system 520 to present the multimedia content or modified multimedia content in accord with the selected or modified story line scenarios and/or gameplay scenarios and based on the determined location of the visitor or ride vehicle 115 and/or the visitor inputs.

At step 630, controlling system 510 causes transportation system 505 to move at least one ride vehicle 115 (or moving walkway) along track 110 or selected sub-tracks 405 based on the determined location of the visitor or ride vehicle 115 and/or the visitor inputs. At the same step 630, controlling system 510 may optionally activate or deactivate one or more actuators 530. For example, controlling system 510 may cause opening or closing the entrance and exit doors 120 based on predetermined rules, the determined location of the visitor or ride vehicle 115, and/or the visitor inputs.

Hence, steps 625-630 allow controlling system 510 adopt the ride experience of the visitors based on their interaction with the multimedia content. For example, in one embodiment, when a first group and second group of visitors initially enter a first room or building 105 (Scene 1), they are both presented with the same predetermined multimedia content (see step 610). Next, at steps 615-620, controlling system 510 aggregates visitors' inputs and their location or location of ride vehicle 115. For instance, controlling system 510 receives user selections on what path or route they want to take or determines whether the visitors hit or missed one or more virtual targets displayed on screens 125. Next, at steps 625-630, controlling system 510 modifies or selects a story line scenario or game play scenario based on the aggregated visitors' inputs and their location or location of ride vehicle 115. The modified or selected story line scenario or gameplay scenario ultimately causes modification of the multimedia content presented to the visitors and/or their movement within the attraction. For example, based on the game performance results, as determined by controlling system 510, the first group of visitors may be moved along one sub-track to a second room or building 105 (Scene 2) to present second multimedia content with which they can continue to interact. A second group of visitors may be moved along another sub-track to a third room or building 105 (Scene 3) to present third multimedia content, which differs from the second multimedia content. Further, in each of the rooms or buildings 105, the visitors can continue interacting with the multimedia content, which will cause its modification in a unique and optionally non-predetermined manner.

At step 640, controlling system 510 optionally causes one or more special effect devices 430 to present one or more special effects along track 110 at predetermined locations or locations selected by controlling system 510. Similar to above, the special effects can be generated based on the predetermined rules, determined location of the visitor or ride vehicle 115, and/or the visitors' inputs.

Further, all or some of steps 605-640 can be repeated until the visitors complete a predetermined task, they are presented with the entire story line scenario, they experience the entire game play scenario, or they visit all or a predetermined number of rooms or buildings 105.

4. Conclusion

Thus, interactive amusement attractions and methods of their operation have been described. At least some technical effects of embodiments of this disclosure may include enhancing functionality of amusement attraction, increasing sophistication of entertainment, and improving the design and construction by enabling visitors to interactively controlling the content and their movement within the interactive amusement attraction.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. An interactive amusement attraction, comprising:
a track arranged inside a room or a building;
a transportation system having at least one ride vehicle configured to move along the track, wherein the at least one ride vehicle includes at least one passenger seat;
at least one rail along the track and at least one driver or motor configured to move the at least one ride vehicle along the track, wherein the at least one ride vehicle is in a rolling contact with the at least one rail; wherein the transportation system further comprises at least one moving walkway along the track and the at least one vehicle is in contact with the at least one moving walkway
at least one screen secured inside the room or the building;
at least one projector secured inside the room or the building and configured to display video content along the track on the at least one screen;
at least one input device associated with the at least one passenger seat and configured to receive visitor inputs; and
an amusement controlling system configured to:
determine a location of the at least one ride vehicle or at least one visitor on the track;
receive the visitor inputs from the at least one input device;
control the at least one projector to display the video content on the at least one screen, wherein the video content is displayed based on the visitor inputs and based on the location of the at least one ride vehicle or the at least one visitor; and
control the transportation system to cause the at least one ride vehicle moving along the track, wherein the at least one ride vehicle is moved based on the visitor inputs and the location of the at least one ride vehicle or the at least one visitor.

2. The attraction of claim 1, further comprising at least one additional room or building, wherein the track is arranged within the at least one additional room or building.

3. The attraction of claim 2, wherein the at least one additional room or building further comprises at least one additional screen secured and at least one additional projector, wherein the amusement controlling system is further configured to control the at least one additional projector to display the video content on the at least one additional screen depending on the visitor inputs and the location of the at least one ride vehicle or the at least one visitor.

4. The attraction of claim 1, wherein the track includes a plurality of sub-tracks connected to each other; and
wherein the amusement controlling system is further configured to select at least one of the sub-tracks for the at least one ride vehicle to move along the selected at least one of the sub-tracks based on a predetermined rule and at least one of the following: the visitor inputs, the location of the at least one ride vehicle, and the location of the at least one visitor.

5. The attraction of claim 1, wherein the input device includes a simulated weapon associated with the at least one passenger seat.

6. The attraction of claim 1, wherein the input device includes a game controller associated with the at least one passenger seat.

7. The attraction of claim 1, wherein the room or the building includes a tunnel.

8. The attraction of claim 1, wherein the room or the building includes a watercraft or a raft.

9. The attraction of claim 1, wherein the room or the building further comprises an entrance door and an exit door, wherein the track is arranged within the room or the building and goes through the entrance door and the exit door.

10. The attraction of claim 9, wherein the amusement controlling system is further configured to open and close the entrance door and open and close the exit door based on a predetermined rule and at least one of the following: the visitor inputs, the location of the at least one ride vehicle, and the location of the at least one visitor.

11. The attraction of claim 1, wherein the at least one screen has at least a partially cylindrical shape.

12. The attraction of claim 1, wherein the at least one screen has at least a partially semi-spherical or spherical shape.

13. The attraction of claim 1, further comprising a water channel arranged along the track inside the room or the building, and wherein the transportation system further comprises at least at least one driver configured to move the at least one ride vehicle along the track.

14. The attraction of claim 1, wherein the at least one ride vehicle includes a floating raft or a boat.

15. The attraction of claim 1, wherein the at least one ride vehicle includes an electrical vehicle configured to move, rotate, or turn based on commands of the at least one visitor.

16. The attraction of claim 1, wherein the at least one ride vehicle includes a roller coaster train having one or more train cars.

17. The attraction of claim 1, wherein the images or the video displayed by the at least one projector are associated with one or more video games or one or more computer games.

18. The attraction of claim 1, wherein the amusement controlling system is further configured to modify the video content displayed by the at least one projector based at least in part on the visitor inputs, the location of the at least one ride vehicle, and/or the location of the at least one visitor.

19. The attraction of claim 1, wherein the amusement controlling system is further configured to control the at least one projector to display one or more virtual targets based on a predetermined rule and at least one of the following: the visitor inputs, the location of the at least one ride vehicle, and the location of the at least one visitor.

20. The attraction of claim 19, further comprising at least one sensor configured to detect an emission from the at least one input device as operated by the at least one visitor, wherein the amusement controlling system is further configured to modify the video content displayed by the at least one projector based at least in part on the detected emission.

21. The attraction of claim 19, wherein the amusement controlling system is further configured to determine whether the determined emission hits or misses one or more virtual targets displayed by the at least one projector, and modify the video content displayed by the at least one projector based at least in part on the determination.

22. The attraction of claim 1, wherein the amusement controlling system is further configured to maintain a plurality of story line scenarios or a plurality of gameplay scenarios, wherein each of the story line scenarios or each of the game play scenarios is associated with the video content.

23. The attraction of claim 22, wherein the amusement controlling system is further configured to select at least one of the story line scenarios or at least one of the gameplay scenarios based on at least one of the following: the visitor inputs, the location of the at least one ride vehicle, and the location of the at least one visitor; and
wherein the amusement controlling system is further configured to modify the video content as displayed by the at least one projector based on the selected at least one of the story line scenarios or at least one of the gameplay scenarios.

24. The attraction of claim 1, further comprising at least one audio device configured to present audio content at selected locations along the track, wherein the at least one audio device is arranged inside the room or the building, wherein the amusement controlling system is further configured to control the at least one audio device to provide the audio content based on the visitor inputs and based on the location of the at least one ride vehicle or the at least one visitor.

25. The attraction of claim 1, further comprising one or more special effects devices configured to generate one or more of wind, fog, smell, a spark, and water spray, wherein the one or more special effect devices are actuated based on the visitor inputs, the location of the at least one ride vehicle, or the location of the at least one visitor.

26. An interactive amusement attraction, comprising:
a building having a track;
a transportation system having at least one moving walkway configured to move at least one visitor along the track;
at least one rail along the track and at least one driver or motor configured to move at least one ride vehicle along the track, wherein the at least one ride vehicle is in a rolling contact with the at least one rail and with the at least one moving walkway;
at least one screen secured inside the building;
at least one projector secured inside the building and configured to display video content along the track on the at least one screen;
at least one input device configured to receive inputs of the at least one visitor; and
an amusement controlling system configured to:
determine a location of the at least one visitor on the track;
receive the inputs of the at least one visitor from the at least one input device;
control the at least one projector to display the images or the video on the at least one screen based on the inputs of the at least one visitor and based on the location of the at least one visitor; and
control the transportation system to cause the at least one moving walkway moving along the track based on the inputs of the at least one visitor and the location of the at least one visitor.

27. A method for providing a ride experience within an interactive amusement attraction, the interactive amusement attraction having at least one room or building with a track, a transportation system with at least one ride vehicle configured to move along the track, at least one rail along the track and at least one driver or motor configured to move the at least one ride vehicle along the track, wherein the at least one ride vehicle is in a rolling contact with the at least one rail, wherein the transportation system further comprises at least one moving walkway along the track and the at least one vehicle is in contact with the at least one moving walkway and an amusement controlling system, the method comprising:
determining a location of the at least one ride vehicle or at least one visitor on the track;
receiving inputs of the at least one visitor from at least one input device associated with the at least one ride vehicle;
presenting at least one image or video on at least one screen positioned along the track inside the room or the building, wherein the at least one image or the video is displayed based on the inputs of the at least one visitor and based on the location of the at least one ride vehicle or location of the at least one visitor on the track;
presenting sounds along the track at selected locations inside the room or the building based on the inputs of the at least one visitor and based on the location of the at least one ride vehicle or location of the at least one visitor on the track; and
moving the at least one ride vehicle along the track inside the room or the building based on the inputs of the at least one visitor and based on the location of the at least one ride vehicle or location of the at least one visitor on the track.

* * * * *